US006067761A

United States Patent [19]

Demeester

[11] Patent Number: 6,067,761

[45] Date of Patent: May 30, 2000

[54] KIT FOR INSTALLATION OF A SLIDING LAMINATED WINDOW IN AN AIRPLANE COCKPIT

[75] Inventor: Jean Demeester, Sully sur Loire, France

[73] Assignee: Saint-Gobain Vitrage, Courbevoie, France

[21] Appl. No.: 09/120,341

[22] Filed: Jul. 22, 1998

[30] Foreign Application Priority Data

Jul. 23, 1997 [FR] France .................................. 97 09348

[51] Int. Cl.[7] ........................................ E06B 3/00

[52] U.S. Cl. .................... 52/208; 52/204.596; 52/204.6; 52/204.62; 428/192

[58] Field of Search .............................. 52/208, 204.593, 52/204.595, 204.6, 204.62, 204.67, 204.68, 204.7, 204.71, 204.72; 428/192

[56] References Cited

U.S. PATENT DOCUMENTS 4,284,677 8/1981 Herliczek ................................ 428/192
4,960,631 10/1990 Walters .................................. 428/192
5,766,755 6/1998 Chaussade .............................. 428/332

FOREIGN PATENT DOCUMENTS 0 376 192 7/1990 European Pat. Off. .
1 537215 7/1968 France .

*Primary Examiner*—Beth A. Stephan
*Attorney, Agent, or Firm*—Oblon, Spivak, McClelland, Maier & Neustadt, P.C.

[57] ABSTRACT

A kit for the installation of a window in a sash (26) IS in the form of a casing having the same surface area as the window and which is installed in sliding manner in a lateral bay window of an airplane cockpit. The kit includes a laminated sheet of glass (10) having at least two sheets of structural glass (12, 14) which are connected to one another by an intermediate layer (16) made of transparent plastic, a joint (22) made of elastomer which is used to cover the side and edge of the sheets of structural glass, and a retaining section (34) in the shape of a casing having the same surface area as the sash. The section is provided with a first wing which is to be bolted to the sash and a second wing capable of securing a peripheral edge of the sheets of structural glass against the sash, and at least one series of bolts (46, 48) used to secure the retaining section on the sash.

3 Claims, 2 Drawing Sheets

34
44
40
23
27
29
18
10
II
II

KIT FOR INSTALLATION OF A SLIDING LAMINATED WINDOW IN AN AIRPLANE COCKPIT

BACKGROUND OF THE INVENTION

1. Field of the Invention

The present invention pertains to a sliding bay window of an airplane cockpit. More particularly, it pertains to a kit for the installation of a sliding laminated window.

2. Description of the Related Art

French patent 2,720,029 discloses a laminated window for the windshield of an airplane cockpit, which includes at least two sheets of structural glass connected to one another by an intermediate layer made of transparent plastic material, polyvinylbutyral (PVB) or polyurethane for example.

The sheet of structural glass which faces towards the outside of the pilot's cabin can be covered by a third sheet made of tempered glass or glass reinforced chemically, through the intermediary of another intermediate layer made of PVB or of polyurethane. The third sheet and the second intermediate layer have dimensions that are reduced with respect to those of the two sheets of structural glass, so as to form on the latter an overlapping peripheral edge. This edge is received in a rabbet frame formed on the periphery of a cockpit window and is held in the rabbet by a pinching action.

This window allows one to contain, under all circumstances, the differential pressure which exists between the outside and the inside of the cockpit, and to resist violent shocks which can occur during flight, such as impacts with birds.

A sliding window is generally secured on a metal sash in the shape of a rectangular casing installed in sliding fashion in the bay window. One known mode of installation consists in securing the window on the sliding sash by means of bolts which pass through the window into the area of its peripheral edge. However, this solution is not entirely satisfactory because the holes made for passage of the bolts make the window fragile. Moreover, when there are variations of outside temperature there can occur a concentration of stresses on the window, at the location of the bolts, which are due to the differential expansion between the glass and the sash. On the other hand, the bolted windows are difficult to put in place because it is necessary to be able to exactly align the holes of the window with those of the sash and to make the bolt passage holes airtight on the sash and on the window.

In another known mode of installation the perforations for passage of the bolts are moved to a composite border located on the periphery of the window. This edging is comprised of at least two layers of plastic which include between them a layer formed by the extension of the first intermediate layer beyond the two sheets of structural glass. But this solution is complex and expensive, and has the disadvantage of irregular deformation of the edge in the proximity of the bolts, which can cause lapses of airtightness.

SUMMARY OF THE INVENTION

The present invention intends to overcome these disadvantages and it has as an object a kit for the installation of a window on a sash in the form of a casing installed in sliding manner in a lateral bay window of an airplane cockpit.

According to a feature of the invention, the above and other objects are achieved by a laminated window comprised of at least two sheets of structural glass which are connected to one another by an intermediate layer made of transparent plastic; an elastomer joint which is used to cover the edge and side of the sheets of structural glass; a holding section in the form of a casing with the same surface area as the sash, the section being provided with a first wing to be bolted to the sash and a second wing that can squeeze the peripheral edge of the sheets of glass against the sash; and at least one series of bolts to secure the holding section on the sash.

According to the invention, the window will keep its structural integrity since it is not perforated but only squeezed at its edge area. In addition, the loads which are exerted in the plane of the window and which are due to the difference of expansion between the glass and the casing are easily transmitted up to the edge of the window since no bolt holds this edge.

The replacement of a window can be accomplished without any special precaution because even if the holes of the holding section are not in perfect coincidence with those of the sash, there is no danger that the bolts will damage the window.

BRIEF DESCRIPTION OF THE DRAWINGS

The invention will be described now with respect to the attached drawing in which.

DETAILED DESCRIPTION OF THE PREFERRED EMBODIMENT

Figure 1:
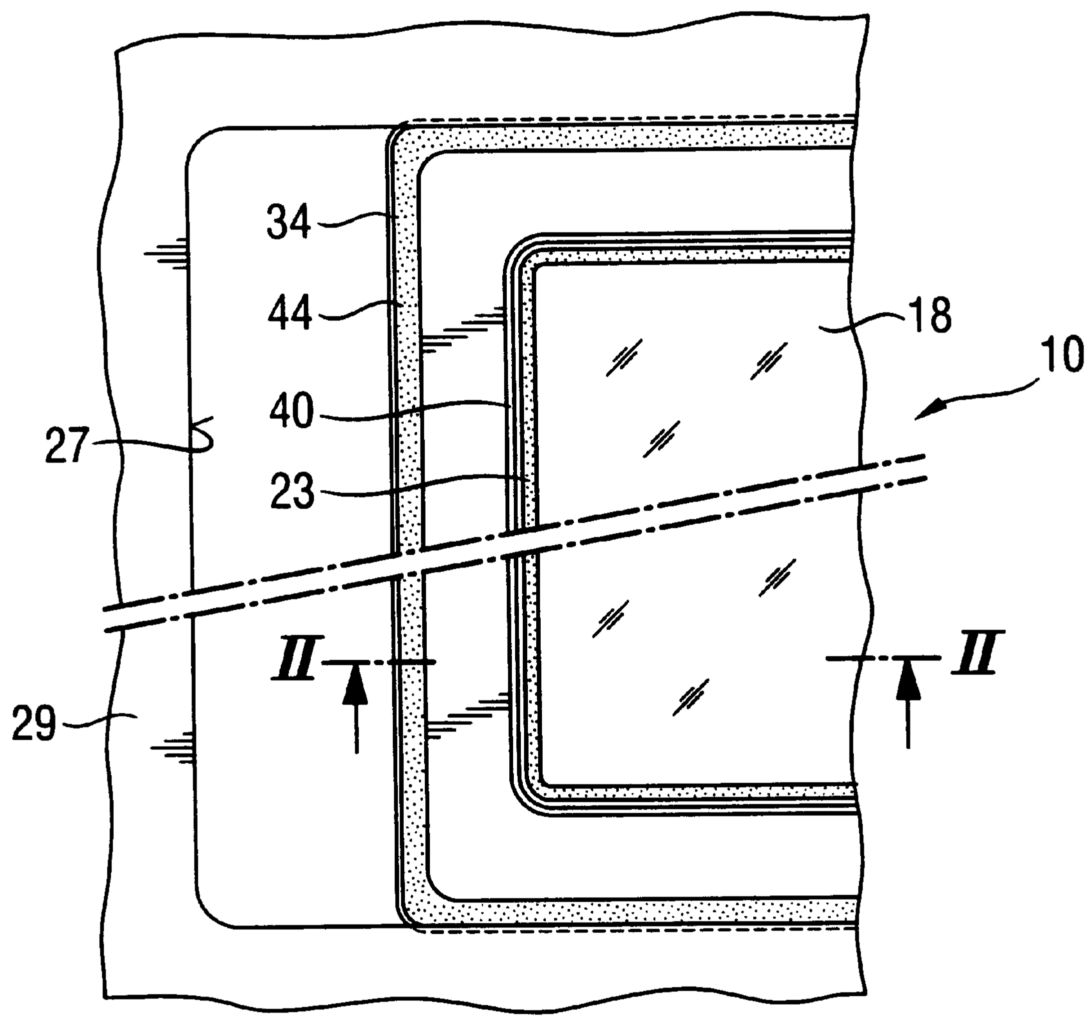
FIG. 1 is a partial elevated view of a sliding lateral window of an airplane cockpit installed on a sash.
Figure 2:
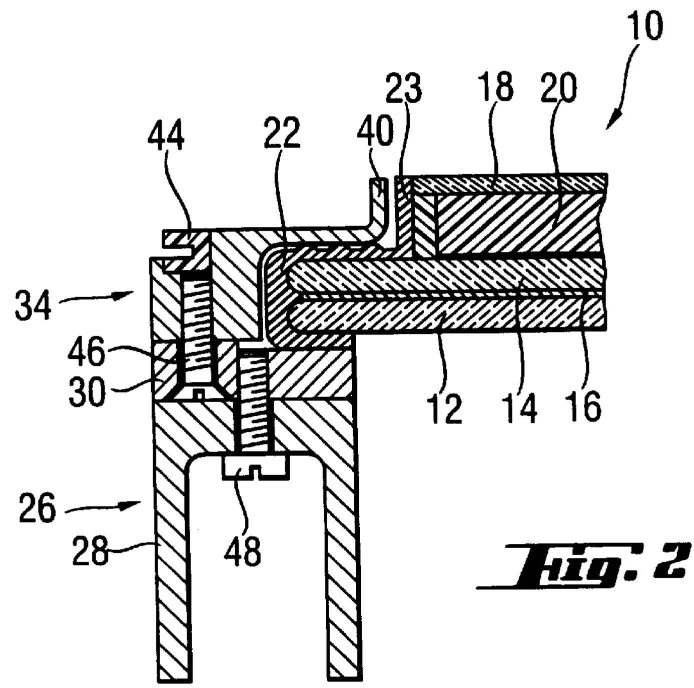
FIG. 2 is a partial view along line II—II of FIG. 1, showing the window, the sash as well as the components used to assemble the window to the sash.
Figure 3:
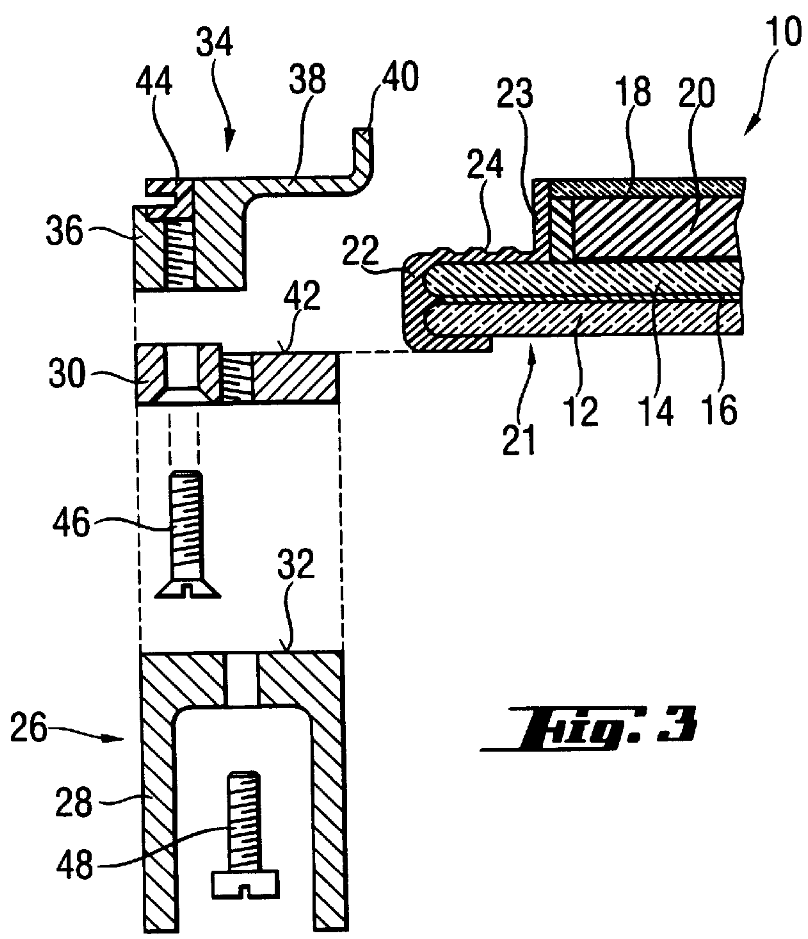
FIG. 3 is an exploded view similar to that of FIG. 2.

FIGS. 1 and 2 show a window 10 for an airplane cockpit and comprised of two sheets of structural glass 12 and 14 made of tempered glass or reinforced chemically, connected to one another by an intermediate layer 16 made of transparent plastic material, polyvinylbutyral or polyurethane for example.

The sheet of glass 14 is covered by a third layer of glass 18, also of tempered glass or glass reinforced chemically, which comprises the external side of the window with respect to the pilot's cabin. This third sheet of glass is connected to the sheet of structural glass 14 through the intermediary of a second intermediate layer 20 made of PVB.

The dimensions of the third layer of glass 18 and of the second intermediate layer 20 are smaller than those of the sheets of structural glass 12 and 14, so that there will be formed on the latter a peripheral overlapping edge 21. On this edge there is fitted a joint 22 made of silicone in U section and which includes a wing 23 which covers the edges of the third sheet of glass 18 and the second intermediate layer 20. The joint is provided on at least one of its sides with longitudinal ribs 24 which are used to ensure good anchoring of the joint in the rabbet.

The window 10 is secured on a sash 26 which is installed in sliding fashion in a bay window 27 of the airplane cockpit 29. FIG. 2 gives an example of implementation of the sash as it is found on the majority of airplanes and especially on the Airbus A 320, but it goes without saying that the window can be secured to any other type of sash.

The sash 26 includes a profile section 28 in the shape of a U, in the form of a rectangular casing of the same dimensions as the window, and a flat crown 30 of the same surface areas and section as the shaped section 28. The crown 30 is secured to the external side of the central wall 32 of the shaped section 28.

The peripheral edge 21 of the window, provided with a joint 22, is squeezed between the external side of the crown 30 and a holding section 34 approximately in the shape of a Z. This section includes a first wing 36 which rests on the crown, a central wing 38 used to support the grooved side 24 of the joint and a terminal wing section 40 used to rise along the wing 23 of joint 22. The first wing section 36 covers only the external edge of the upper side 42 of the crown and therefore leaves free on this side an opening in which the overlapping part 21 of the window can come to rest.

The holding section 34 is provided with an annular airtight joint 44 made of elastomer in order to ensure airtightness of the window with respect to the cockpit cabin.

Replacement of the window is accomplished as follows: one begins by assembling the crown 30 and the holding section 34 using a first series of bolts 46. After the edge 21 of the window provided with the joint 22 is introduced into the rabbet formed by the crown 30 and the holding section 34, bolts 46 are tightened. The assembly unit thus formed is secured on side 32 of the section 28 by means of a second series of bolts 48.

It goes without saying that the crown 30 can be formed in a single piece with the profile section 28. In this case the holding section 34 is secured directly on the section 28, only the set of bolts 48 then being used.

All of the previously described components can be offered and sold in the form of a kit, which can be used each time that one wishes to replace a window.

What is claimed is:

1. A kit for the installation of a window on a window sash including a casing which is slidably installed in a lateral bay window of an airplane cockpit, the casing having the same surface area as the window, the kit comprising;

a laminated window comprised of at least two sheets of structural glass connected to one another by an intermediate layer of transparent plastic;

a joint made of elastomer and covering an edge and side of the sheets of structural glass;

a holding section in the form of a casing with the same surface area as a sash of a window to which the kit is to be mounted, said holding section including a first wing configured to be mounted to the sash and a second wing configured to define a rabbet in cooperation with said sash, so as to squeeze the peripheral edge of the sheets of structural glass against the sash when the first wing is mounted to the sash; and at least one first securing element for securing the holding section on the sash, wherein an exterior one of said sheets of structural glass with respect to the cockpit cabin is covered by a third sheet of glass via a second intermediate layer made of plastic, said third sheet of glass and said second intermediate layer having dimensions less than those of the tow sheets of structural glass so as to expose the peripheral edge of the sheets of structural glass.

2. The kit according to claim 1, wherein the holding section is united with a crown of a sash of a window to which the kit is to be mounted via at least one second securing element.

3. The kit according to claim 1, where in the first wing of the holding section covers an external edge of a support wall of a profile section of a sash of a window to which the kit is to be mounted, and leaves free an internal edge of the support wall of the profile section when the first wing is mounted to the sash, to define the rabbet in which the edge of the window is squeezed.

* * * * *